(12) United States Patent
Sundararaj et al.

(10) Patent No.: US 11,297,564 B2
(45) Date of Patent: Apr. 5, 2022

(54) SYSTEM AND METHOD FOR ASSIGNING DYNAMIC OPERATION OF DEVICES IN A COMMUNICATION NETWORK

(71) Applicant: HCL Technologies Limited, New Delhi (IN)

(72) Inventors: Jayaramakrishnan Sundararaj, Bangalore (IN); Harikrishna C. Warrier, Bangalore (IN); Banish Bansal, Noida (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 17/143,626

(22) Filed: Jan. 7, 2021

(65) Prior Publication Data
US 2021/0219219 A1 Jul. 15, 2021

(30) Foreign Application Priority Data
Jan. 10, 2020 (IN) .............................. 202011001265

(51) Int. Cl.
*H04W 48/18* (2009.01)
(52) U.S. Cl.
CPC .................................. *H04W 48/18* (2013.01)
(58) Field of Classification Search
CPC .............................. H04W 48/18; H04W 60/00
See application file for complete search history.

(56) References Cited

U.S. PATENT DOCUMENTS

| 10,404,727 | B2 | 9/2019 | Vasseur et al. |
| 10,411,964 | B2* | 9/2019 | Zhang ................. H04L 41/0806 |
| 11,108,643 | B2* | 8/2021 | Kommula ........... G06F 9/45558 |
| 2017/0310691 | A1* | 10/2017 | Vasseur ............... H04L 63/1458 |
| 2017/0367036 | A1 | 12/2017 | Chen et al. |
| 2019/0140933 | A1 | 5/2019 | Guim Bernat et al. |
| 2019/0261260 | A1 | 8/2019 | Dao et al. |
| 2020/0052991 | A1* | 2/2020 | Kodaypak ............. H04L 47/801 |

FOREIGN PATENT DOCUMENTS

WO  2018089417 A1  5/2018

* cited by examiner

*Primary Examiner* — Marcus Hammonds
(74) *Attorney, Agent, or Firm* — Kendall Sheets (57) ABSTRACT

The present disclosure relates to a system (102) for assigning dynamic operation of devices in a communication network (106). The system (102) receives one or more behavioral attributes and one or more contextual attributes associated with one or more devices (232) in a communication network (106). The system (102) further determines one or more clusters (234) associated with each device from the one or more devices (232). The system (102) further determines, dynamically, one or more network slices, from a set of network slices associated with the one or more clusters (234). The system (102) further determines, dynamically, one or more analytics models associated with the one or more clusters (234). The system (102) further assigns dynamic operation of the one or more clusters (234) based on the one or more contextual attributes, the one or more network slices and the one or more analytics models.

16 Claims, 9 Drawing Sheets

SYSTEM AND METHOD FOR ASSIGNING DYNAMIC OPERATION OF DEVICES IN A COMMUNICATION NETWORK

CROSS-REFERENCE TO RELATED APPLICATIONS AND PRIORITY

This patent application does not claim priority from any application. The present application claims benefit from Indian Complete Patent Application No. 202011001265 filed on 10 Jan. 2020 the entirety of which is hereby incorporated by reference.

TECHNICAL FIELD

The present disclosure in general relates to the field of a telecommunication network. More particularly, the present invention relates to system and method for assigning dynamic operation of devices in a communication network.

BACKGROUND

An edge computing is a cloud-based computing. The edge computing moves centralized data computing closer to end devices connected to a communication network in order to improve response time and save bandwidth. The edge computing reduces a dependency on cloud centric infrastructure by providing faster response and handling of a specific task to the end devices or applications. Generally, the edge computing is not adaptive to different dynamically changing nature of new communication techniques such as Internet of Things (IoT), 5G and the like, due to a static behavior of the edge computing system. Typically, edge devices have pre-configured data analytics models, network slices and algorithms for performing specific operations.

SUMMARY

Before the present system and method for assigning dynamic operation of devices in a communication network is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for assigning dynamic operation of devices in a communication network. This summary is not intended to identify essential features of the claimed subject matter nor is it intended for use in determining or limiting the scope of the claimed subject matter.

In one implementation, a system for assigning dynamic operation of devices in a communication network is illustrated. The system may comprise a memory and a processor coupled in the memory. The processor may be configured to execute instructions stored in the memory to receive one or more behavioral attributes and one or more contextual attributes associated with one or more devices in a communication network. The one or more contextual attributes may indicate an intent of operation of the one or more devices. Further, the processor may be configured to execute instructions stored in the memory to determine one or more clusters associated with each device from the one or more devices based on the one or more behavioral attributes and the one or more contextual attributes. Furthermore, the processor may be configured to execute instructions stored in the memory to determine dynamically one or more network slices from a set of network slices associated with the one or more clusters. The one or more network slices may be determined based on a mapping of the one or more network slices with the one or more contextual attributes. Furthermore, the processor may be configured to execute instructions stored in the memory to determine dynamically one or more analytics models associated with the one or more clusters. The one or more analytics models may be determined based on the one or more contextual attributes and the one or more behavioral attributes. Furthermore, the processor may be configured to execute instructions stored in the memory to assign dynamic operation of the one or more clusters based on the one or more contextual attributes, the one or more network slices, and the one or more analytics models, thereby assigning the dynamic operation of the devices in the communication network.

In another implementation, a method for assigning dynamic operation of devices in a communication network is illustrated. The method may comprise, receiving, by a processor, one or more behavioral attributes and one or more contextual attributes associated with one or more devices in a communication network. The one or more contextual attributes may indicate an intent of operation of the one or more devices. Further, the method may comprise, determining, by the processor, one or more clusters associated with the one or more devices based on the one or more behavioral attributes and the one or more contextual attributes. Furthermore, the method may comprise, determining dynamically, by the processor, one or more network slices from a set of network slices associated with the one or more clusters. The one or more network slices may be determined based on a mapping of the one or more network slices with the one or more contextual attributes. Furthermore, the method may comprise, determining dynamically, by the processor, one or more analytics models associated with the one or more clusters. The one or more analytics models may be determined based on the one or more contextual attributes and the one or more behavioral attributes. Furthermore, the method may comprise, assigning, by the processor, dynamic operation of the one or more clusters based on the one or more contextual attributes, the one or more network slices, and the one or more analytics models, thereby assigning the dynamic operation of the devices in the communication network.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "comprising", "receiving", "determining", "assigning" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for assigning dynamic operation of devices in a communication network are now described. The disclosed embodiments of the systems and methods for assigning dynamic operation of devices in a communication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for assigning dynamic operation of devices in a communication network is not intended to be limited to the embodiments illustrated, but is to be accorded the widest scope consistent with the principles and features described herein.

Conventionally, edge computing systems may have pre-configured and hard coded data analytics models and algorithms for specific operations. Generally, it may not be possible to dynamically configure and select analytical models for one or more edge devices based on one or more contextual attributes. This may lead to inefficient network bandwidth allocation for the one or more edge devices in the edge computing systems. Further, the conventional edge systems may lack an effective handling of network slicing mechanism dynamically, as per changing requirement of the one or more edge devices in a location. The lack of the effective handling of the network slicing mechanism may be due to standalone edge devices with limited processing and decision-making capability.

The present subject matter overcomes a problem of pre-configured and hard-coded edge computing systems. The present subject matter relates to a system for assigning dynamic operation of devices connected to a communication network. The system may perform intelligent clustering of one or more devices based on one or more behavioral attributes of the devices and one or more contextual attributes. The one or more contextual attributes may be one or more attributes associated with a context. The context may be referred to as an intent of operation of the one or more devices. Further, the system may dynamically select one or more network slices from a set of network slices associated with one or more clusters based on the one or more contextual attributes. In addition, the system may dynamically select one or more analytics model associated with the one or more clusters, based on the one or more contextual attributes and the one or more behavioral attributes. Further, the system may assign dynamic operation of the one or more clusters based on the one or more contextual attributes, the one or more network slices, and one or more analytics models.

Furthermore, the present subject matter may utilize a neural based model with intelligent deep learning capabilities for performing a mapping between the one or more clusters and the one or more network slices. The system may be adapted to configure and select one or more analytics models associated with the one or more clusters. In one aspect, based on a specific contextual attribute, the one or more clusters associated with the one or more devices may be programmed to behave in a specific way and get connected to a specific network slice. However, in another aspect, in case of a change in the one or more contextual attributes, the same cluster associated with the one or more devices may be modified to behave differently with regards to the one or more analytics models and connectivity to the one or more network slices. It is to be noted that the system may lead to an overall improvement in network connection.

Figure 1:
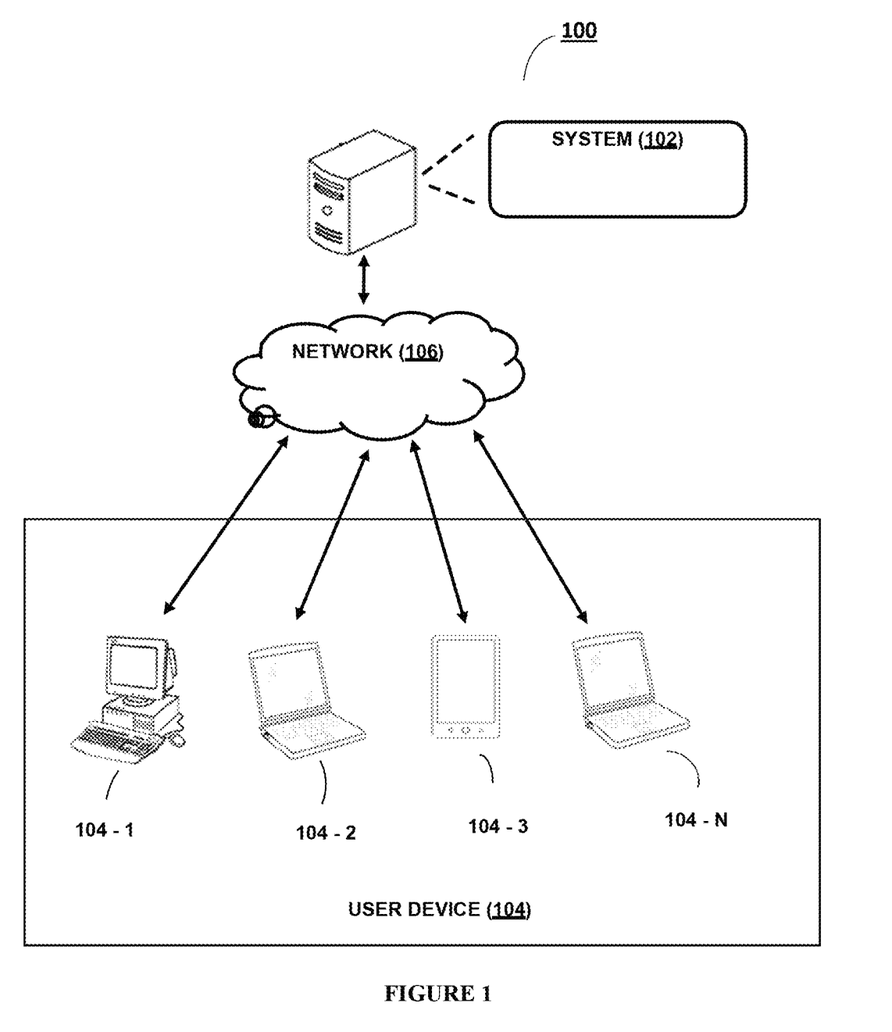
FIG. 1 illustrates a network implementation of a system 102 for assigning dynamic operation of devices in a communication network, in accordance with an embodiment of the present subject matter.

Referring now to FIG. 1, a network implementation 100 of a system 102 for assigning dynamic operation of devices in a communication network is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive one or more behavioral attributes and one or more contextual attributes associated with one or more devices connected to a communication network 106. The one or more contextual attributes may indicate an intent of operation of the one or more devices. Further, the system 102 may determine one or more clusters associated with each device from the one or more devices based on the one or more behavioral attributes and the one or more contextual attributes.

Further, the system 102 may determine one or more network slices associated with the one or more clusters dynamically. In one embodiment, the one or more network slices may be determined based on a mapping of the one or more network slices with the one or more contextual attributes. Further, the system 102 may determine one or more analytics models associated with the one or more clusters dynamically. In one embodiment, the one or more analytics models may be determined based on the one or more contextual attributes and the one or more network slices. Furthermore, the system 102 may assign dynamic operation of the one or more clusters based on the one or more contextual attributes, the one or more network slices and the one or more analytics models.

Figure 2A:
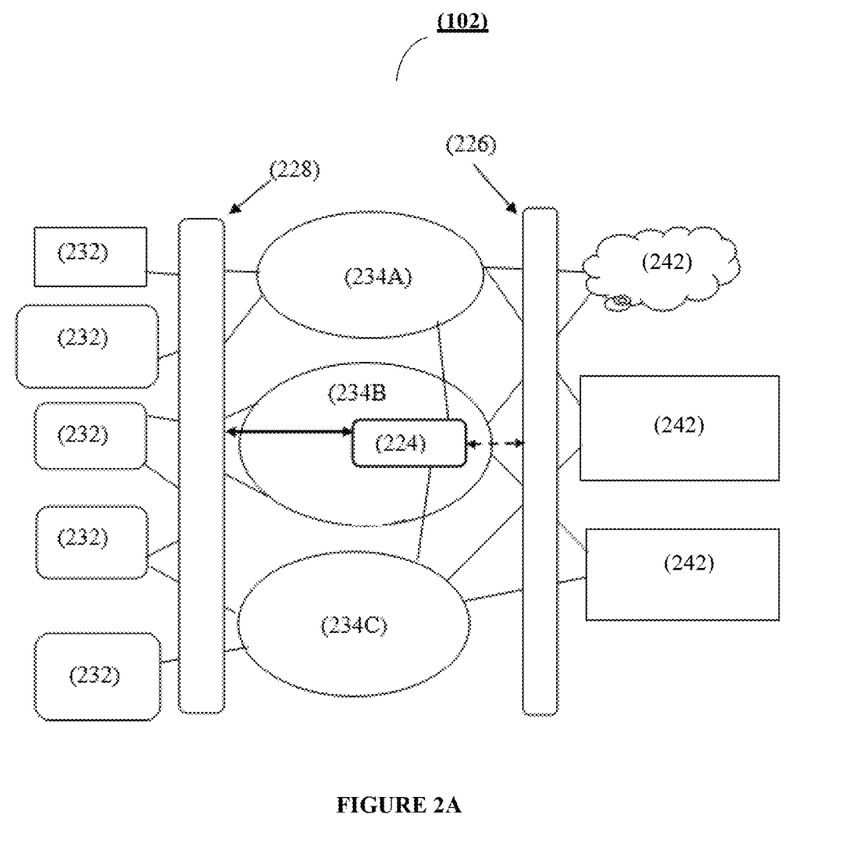
FIG. 2A illustrates an architecture of the system 102 for assigning dynamic operation of devices in a communication network, in accordance with an embodiment of the present subject matter.
Figure 2B:
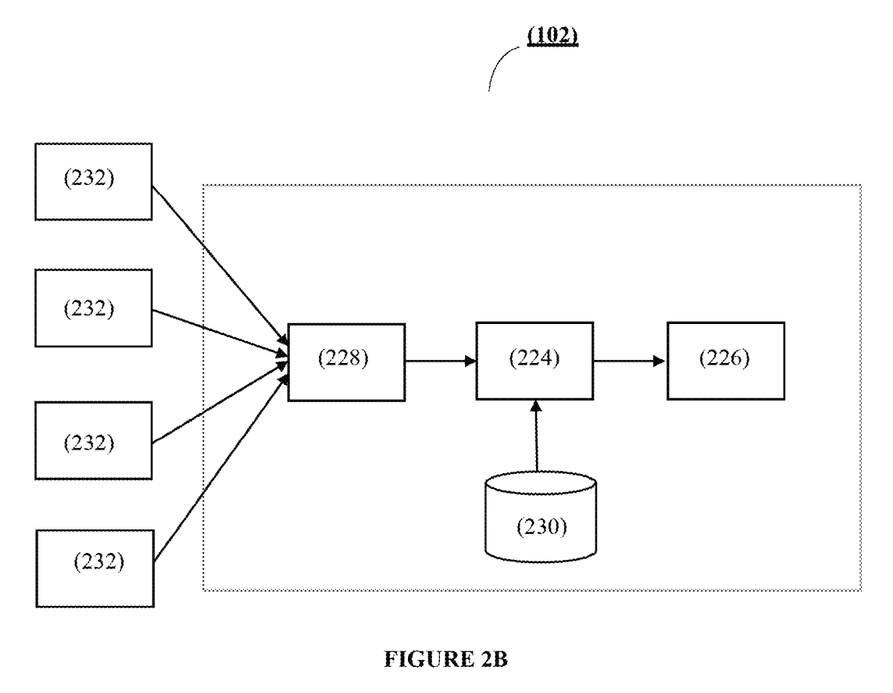
FIG. 2B illustrates a framework deployment of the system 102 for assigning dynamic operation of devices in a communication network, in accordance with an embodiment of the present subject matter.
Figure 2C:
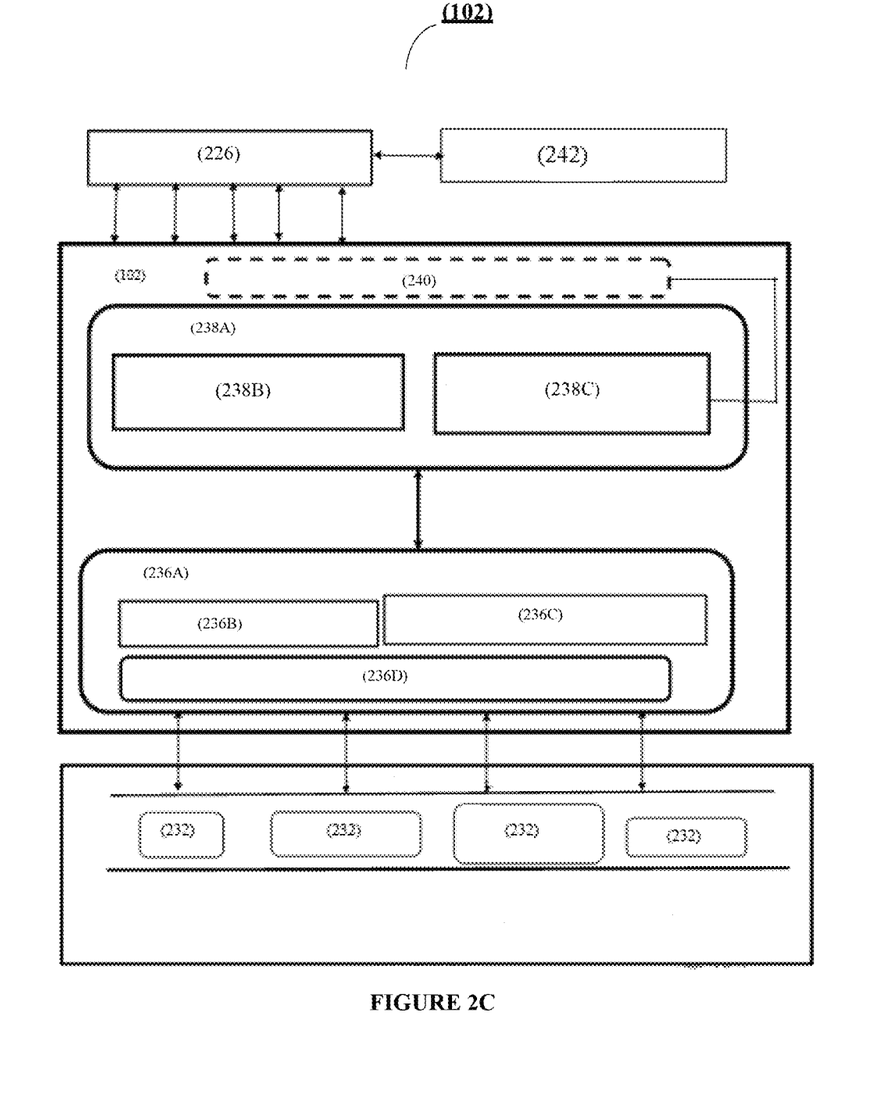
FIG. 2C illustrates components of the system 102 for assigning dynamic operation of devices in a communication network, in accordance with an embodiment of the present subject matter.

Referring now to FIG. 2A, an architecture of the system 102 for assigning dynamic operation of devices in a communication network is illustrated in accordance with an embodiment of the present subject matter. Referring now to FIG. 2B, a framework deployment of the system 102 for assigning dynamic operation of devices in a communication network, is illustrated in accordance with an embodiment of the present subject matter. Referring now to FIG. 2C, components of the system 102 for assigning dynamic operation of devices in a communication network are disclosed in accordance with an embodiment of the present subject matter. Further, the FIGS. 2A, 2B, and 2C are explained together.

In one embodiment, the system 102 may include at least one processor (not shown), an input/output (IO) interface (not shown), and a memory (not shown). The at least one processor may be implemented as one or more microprocessors, microcomputers, microcontrollers, digital signal processors, central processing units, state machines, logic circuitries, and/or any devices that manipulate signals based on operational instructions. Among other capabilities, at least one processor may be configured to fetch and execute computer-readable instructions stored in the memory.

The I/O interface may include a variety of software and hardware interfaces, for example, a web interface, a graphical user interface, and the like. The I/O interface may allow the system 102 to interact with the user directly or through the user device 104. Further, the I/O interface may enable the system 102 to communicate with other computing devices, such as web servers and external data servers (not shown). The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include data.

In one implementation, a user may access the system 102 via the I/O interface. The user may be registered using the I/O interface in order to use the system 102. In one aspect, the user may access the I/O interface of the system 102 for obtaining information, providing input information or configuring the system 102.

In one embodiment, the system 102 may be configured to receive one or more behavioral attributes and one or more contextual attributes associated with one or more devices 232 in a communication network 106. The one or more contextual attributes may be one or more attributes of a context. The one or more contextual attributes of the context may indicate an intent of operation of the one or more devices 232. More particularly, the intent of operation may indicate an operation of the one or more devices 232 in a specific context or situation.

Further, the one or more behavioural attributes and the one or more contextual attributes may comprise the intent of the operation for performing one or more of a prediction, an image recognition, a forecasting, an anomaly detection, a filtering, a flow management, a trend analysis and other artificial intelligence operations with speed, latency, and efficiency of the one or more devices 232.

In one embodiment, system 102 may comprise an application function 226. The application function 226 may trigger a deployment of a specific scenario for an iEDGE (Intelligent Edge) framework. The specific scenario may indicate a specific context for deployment. The application function 226 may be connected to one or more end applications 242. The one or more end applications 242 may be cloud/internet, PAN (Cooperates/Security Agencies), Air Traffic Control/Satcom control centers.

In one embodiment, the system 102 may comprise a gateway 228. The gateway 228 may be an Intelligent Cluster Gateway (ICG). The gateway 228 may be connected to the one or more devices 232. The one or more devices 232 may be user devices related to vertical categories such as education, health care, entertainment, security, public safety, traffic management, corporate trainings etc.

The system 102 may further comprise a core 224. In one embodiment, the core may be an iEDGE interface. Further, based on the specific context, the core 224 may trigger a request of the one or more contextual attributes to the gateway 228. Further, in response to the request, the gateway 228 may send the one or more contextual attributes to the core 224.

Further, the system 102 may be configured to determine one or more clusters 234 associated with each device from the one or more devices 232 based on the one or more behavioral attributes and the one or more contextual attributes.

In one embodiment, the Intelligent Cluster Gateway (ICG) 228 may comprise an Intelligent Data Model Identifier (IDMI) 236A as a processing unit. The IDMI 236A may be configured to identify type of the one or more connected devices 232 for determining the one or more clusters 234 associated with each device from the one or more devices 232. The IDMI 236A may determine the one or more clusters 234 associated with each device from the one or more devices 232, based on the one or more contextual attributes and the one or more behavioral attributes.

In one exemplary embodiment, one or more low latency based devices at different locations may be clustered together. Further, one or more low latency but less priority devices may be placed in a different cluster. Furthermore, one or more security based devices for specific groups, like enterprises, may require different machine learning algorithms and may be placed in a different cluster. The IDMI 236A may further comprise a machine learning data processing model 236B, a device and edge cluster mapping module 236C and a data tuning and segregator module 236D.

In one embodiment, the machine learning data processing model 236B may comprise one or more machine learning algorithms as well as neural based deep learning algorithms to produce better network slice selection for a particular source IoT, sensor data types, requirement along with predicting better EDGE cluster network for data handling. The module 236B may predict data nature based on behavioural and contextual nature, and select an accurate network slice for data connection with end systems, and services. Further, the module 236B may suggest best possible edge device to process the data.

In one embodiment, the device and edge cluster mapping module 236C may accurately map the edge device cluster with accurate source devices based on the machine learning data processing model 236B.

In one embodiment, the data tuning and segregator module 236D may determine the kind of data and its associated devices such as a High HD video stream, AR/VR/MR data, voice data, a huge file transfer for cloud, an HD camera data, and the like. The data tuning and segregator module 236D may fine tune the data to enable a particular network slice and one or more edge devices to establish best specific end to end connection.

In one embodiment, the one or more clusters 234 may be one of a Conventional Edge Cluster (CEC) 234A, a New Radio Edge Cluster (NREC) 234B, and a Low Power Devices based Edge Cluster (LPDEC) 234C.

In one aspect, the Conventional Edge Cluster (CEC) 234A may comprise one or more devices supporting one of a Wireless Fidelity (Wi-Fi), Long term Evolution (LTE), Global System for Mobile (GSM), Code Division Multiple Access (CDMA) based communication and the other legacy wireless communication techniques.

In one aspect, the New Radio Edge Cluster (NREC) 234B may comprise one or more devices supporting New Radio (NR) type 5G communication configured with the one or more network slices.

In one aspect, the Low Power Devices based Edge Cluster (LPDEC) 234C may comprise one or more devices supporting one of a NB-LTE, LoRAWAN, Near Field Communication (NFC), IPv6 Low Power Wireless Personal Area Networks (6LoWPAN), Z-Wave, SigFox based communication and other low power short range radio access technologies.

In one embodiment, the NREC 234B, may be multitude in number and may increase by adding or converting adjacent one or more clusters 234 to support one or more of sensors, IoT devices, V2V (Vehicle-to-Vehicle), V2X (Vehicle-to-everything), AR/VR/MR type devices. The one or more devices associated with the NREC 234B may support the functionalities of the CEC cluster 234A and the LPDEC cluster 234C as per requirement.

In one embodiment, the ICG 228 and the core 224 may communicate directly at specific intervals. The core 224 may modify the one or more clusters 234 based on receiving inputs from the ICG 228.

The system 102 may be configured to determine one or more network slices from a set of network slices associated with the one or more clusters 234 dynamically. The one or more network slices may be determined based on a mapping of the one or more network slices with the one or more contextual attributes. In one aspect, the mapping of the one or more network slices with the one or more contextual attributes may be generated based on a neural based model 240 with deep learning techniques. The neural based model 240 may utilize historical data to generate the mapping.

Further, the one or more network slices may comprise one or more network slice parameters. The one or more network slice parameters may be used for dynamic decision making. The one or more network slice parameters may comprise one or more of a device type, a bandwidth, a latency, a coverage, a mobility, a cluster type, an access protocol, an edge support, a service type, a throughput requirement, a periodic communication type, an isolation level, a slice type, a frequent changing behavior of device cluster or context, and most used network slicing type.

In one embodiment, different source nodes may be assigned to a specific network slicing algorithm associated with the one or more devices 232 based on the one or more contextual attributes. The one or more contextual attributes may be a network protocol type, a bandwidth requirement, a connection protocol with range, an application usage pattern, a device density, a type of user services, an application requirement and the like.

In one embodiment, edge service functionality in the system 102 may be defined based on one or more spectrum of the one or more devices 232, one or more types, and the one or more contextual attributes dynamically. The edge service functionality may indicate an intent of the operation for deciding the cluster for the edge device in order to apply the network slice, the analytics algorithm and the context. The system 102 may comprise a network slicing module 238A. The network slicing module 238A may be an Intelligent Core EDGE Slicing System (ICESS). The ICESS 238A may initiate a network slicing functionality. The network slicing functionality may indicate a creation of the one or more network slices associated with the one or more devices 232.

Further, the network slicing functionality may be based on one or more data categories and the associated one or more contextual attributes. The one or more data categories may comprise normal network data connection such as 2G, 3G for end applications, services and the like. Further, the one or more data categories may comprise edge based network communication for end application and services. Furthermore, the one or more data categories may comprise 5G communication-based end applications and services. Each cluster 234 associated with the one or more devices 232 may have a network functional requirement, one or more source data types and services type, a demand or requirement type, an end user application type, an application density, and a usage pattern from cloud or enterprise domains. Further, the one or more clusters 234 may have dynamic network slicing functionality based on different network domain attributes, the one or more behavioral attributes associated with the one or more devices 232 and situational based requirements.

The ICESS 238A may further comprise a Contextual based Network Function Service Slicing algorithm (CNFSSA) 238B. The one or more network slices may comprise one or more network slice parameters. The system 102 may normally use the network slicing functionality based on an intelligent sense of the one or more network slice parameters. The one or more network slice parameters may be used for dynamic decision making. The one or more network slice parameters may comprise one or more of a device type, a bandwidth, a latency, a coverage, a mobility, a cluster type, an access protocol, an edge support, a service type, a throughput requirement, a periodic communication type, an isolation level, a slice type, a frequent changing behavior of device cluster or context, and most used network slicing type. The system 102 may not always need to create network slicing as the existing systems may not have the capability to adjust existing and 5G new radio and other 5G network slicing requirement. However, based on big data analysis and model building by machine learning technique, dynamic contextual attributes, and neural based model 240, the one or more network slices may be generated.

In one embodiment, the ICESS 238A may further comprise an Intelligent Adaptive Dynamic Network Slicing algorithm (IADNS) 238C. The IADNS 238C may be configured to perform one or more functions. In one embodiment, the IADNS 238C may perform a function of creating dynamic clustering 234 of each device from the one or more devices 232 based on the one or more dynamic contextual attributes, the one or more behavioral attributes and one or more service requirements.

In one embodiment, the IADNS 238C may further perform a function of creating dynamic core edge node responsible for a time-based network slice creation based on the one or more clusters 234, the one or more behavioral attributes, the one or more service requirements, and the one or more devices 232.

In one embodiment, the IADNS 238C may further perform a function of applying the network slicing functionality to the one or more devices 232 based on the one or more clusters 234 and the one or more behavioral attributes.

In one embodiment, the IADNS 238C may further perform a function of starting or ending the network slicing functionality for ICESS 238A.

In one embodiment, the IADNS 238C may further perform a function of adapting the one or more devices 232 such as simple mobile devices, non IoT devices, AR/VR nodes, vehicles, sensors of different category, IoT devices of different categories to destination end services, cloud processing centres, intelligent end applications 242 that may or may not need the network slicing functionality.

In one embodiment, the IADNS 238C may further perform a function of dynamically adding or removing the one or more devices 232 for the network slicing capability based on the one or more contextual attributes.

Furthermore, the system 102 may be configured to determine one or more analytics models associated with the one or more clusters 234 dynamically. In one embodiment, the IADNS 238C may further perform a function of determining one or more analytics models for network slicing prediction. The one or more analytics models may be determined based on the one or more contextual attributes and the one or more behavioral attributes. The one or more contextual attributes and the one or more behavioral attributes may be analysed based on historical data to determine the one or more analytics models. The one or more analytics models may perform a processing on data generated by the one or more devices 232. The one or more analytics models may comprise one or more of a machine learning model, a neural network model, a deep learning model, a reinforced learning model, a regression model, a classification model and the like.

In one example, the normal machine learning model may be used for simple input data. In another example, the deep learning model may be used for complex input data from the one or more devices 232 connected in real time. The determination of the one or more analytics models may provide a functionality of intelligent network slicing.

In one embodiment, the core 224 may query a database 230 for retrieving a cluster matrix. The cluster matrix may provide a mapping of one or more analytics models and slice requirements for the one or more contextual attributes. Further, the core 224 may provide relevant analytics models and slicing requirements for the one or more contextual attributes. Further, the gateway 228 may apply the mapping and complete the deployment of the one or more devices 232 connected to the communication network 106.

Further, the system 102 may utilize the Neural based Model 240 with deep learning techniques. The Neural based Model 240 may be responsible for creation of the one or more clusters 234 dynamically based on changing network pattern. Further, the Neural based Model 240 may be used to predict the one or more behavioural attributes associated with the one or more devices 232 based on the one or more dynamic contextual attributes, and a requirement of the one or more network slices in real time. The Neural based Model 240 may create the one or more network slices for a particular Quality of Service (QoS). The Neural based Model 240 may utilize historical data to determine the one or more network slices associated with the one or more contextual attributes.

In one embodiment, the system 102 may provide an end to end hybrid edge-based clustering 234 and network slicing improvement.

Further, upon determining the mapping of the one or more clusters 234 with the one or more network slices and the one or more analytics models, the system 102 may be configured to assign dynamic operation of the one or more clusters 234, based on the one or more contextual attributes, the one or more network slices, and the one or more analytics models.

Further, any changes in the one or more contextual attributes may be notified by the one or more devices 232 to the gateway 228. The gateway 228 may further provide delta updates regarding the changes in the one or more contextual attributes to the core 224. The changes in the one or more contextual attributes may indicate a new scenario. Further, the above process may be repeated for the new scenario.

In one embodiment, the system 102 may bridge the conventional and next generation 5G network data processing by utilizing context-aware, dynamic, deep data aggregation and intelligent network slicing algorithms.

Figure 3:
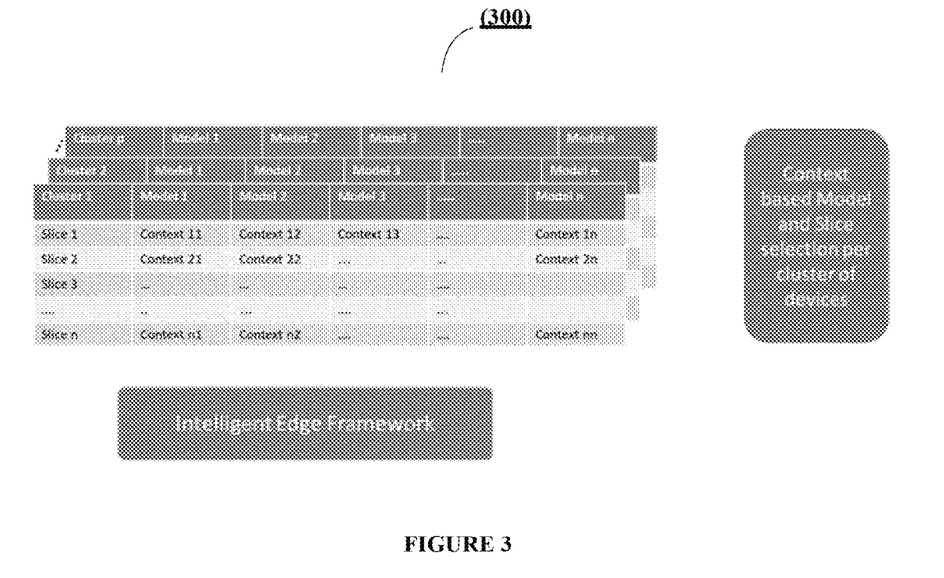
FIG. 3 illustrates an intelligent edge framework 300 with cluster matrix in the system 102 for assigning dynamic operation of devices in a communication network, in accordance with an embodiment of the present subject matter.

Referring now to FIG. 3, an intelligent edge framework 300 with cluster matrix is disclosed for the system 102 for assigning dynamic operation of devices in a communication network, in accordance with an embodiment of the present subject matter.

The intelligent edge framework 300 with cluster matrix discloses a mechanism to systematically program a matrix of one or more analytics models and one or more network slices based on one or more contextual attributes associated with one or more devices. In one aspect, based on a specific contextual attribute, a set or cluster of devices may be programmed to behave in a specific way and get connected to a specific network slice. However, in case of change of the contextual attribute, the same set or cluster of devices may be modified to behave differently with respect to the one or more analytics models and connectivity to the one or more network slices. The matrix shows dynamic operation of the one or more devices based on the one or more contextual attributes.

Figure 4:
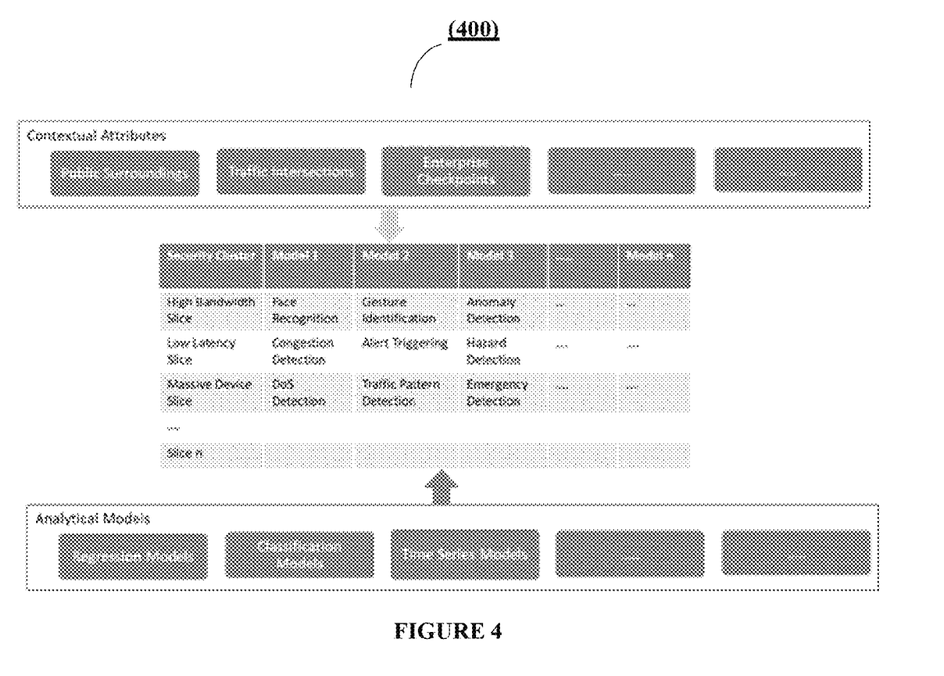
FIG. 4 illustrates a video device framework 400 as an exemplary embodiment of the system 102 for assigning dynamic operation of devices in a communication network, in accordance with an embodiment of the present subject matter.

Referring now to FIG. 4, a video device framework 400 is disclosed as an exemplary embodiment of the system 102 for assigning dynamic operation of devices in a communication network, in accordance with an embodiment of the present subject matter.

The video device framework 400 discloses an operation of one or more video edge devices in a communication network. In one exemplary embodiment, the one or more video edge devices may be operated for one or more contextual attributes. The one or more contextual attributes may indicate an intent of operation of the one or more video edge devices. The one or more contextual attributes associated with the one or more video edge devices may be public surroundings, traffic intersections, enterprise checkpoints and the like. In one aspect, the one or more video edge devices may be used in the public surroundings for general surveillance in order to monitor activities of people in the surroundings. In another aspect, the one or more video edge devices may be used in the traffic intersections for monitoring traffic related activities and patterns. In yet another aspect, the one or more video edge devices may be used in the enterprise checkpoints for monitoring one or more of employee patterns, behaviour and security.

In one embodiment, the one or more video edge devices may be programmed to operate dynamically based on the one or more contextual attributes. The one or more devices may need to behave differently at different times for the one or more contextual attributes. In one exemplary embodiment, a set of enterprise checkpoint devices may have to work as public surrounding devices after office hours. In addition, the set of the enterprise checkpoint devices may have to monitor traffic depending on a location of the set of enterprise checkpoint devices. The system 102 assigns dynamic operations such as one or more of a face recognition, a gesture identification and the like to the one or more video edge devices based on the more contextual attributes.

Further, the video device framework 400 shows a determination and an assignment of one or more network slices such as a high bandwidth slice, a low latency slice, a massive device slice, and the like based on the one or more contextual attributes. In addition, the video device framework 400 shows a determination and an assignment of one or more analytical models, such as a regression model, a classification model, a time-series model, and the like, based on the one or more contextual attributes.

Figure 5:
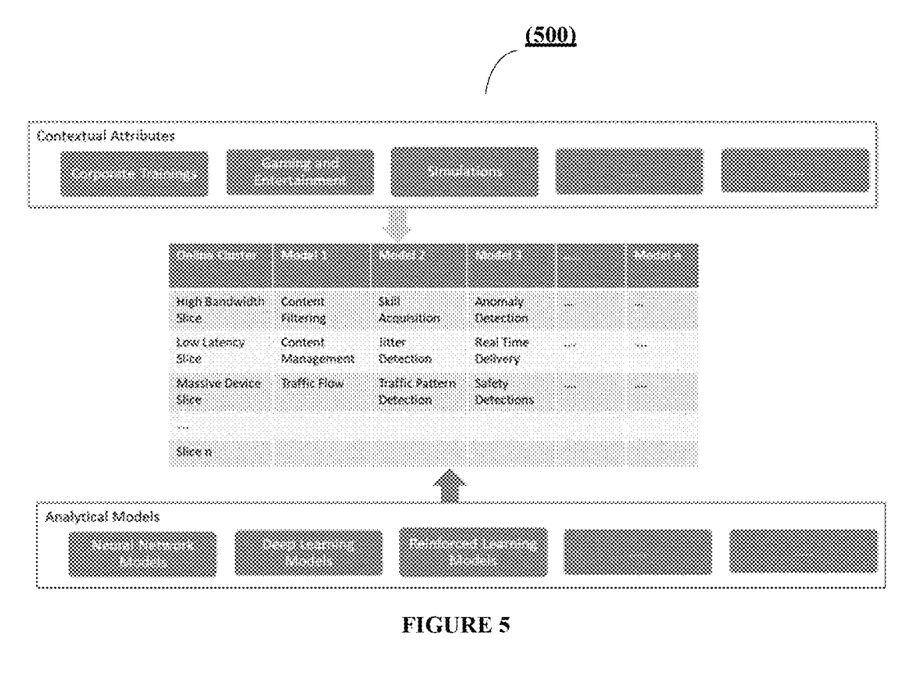
FIG. 5 illustrates an AR/VR device framework 500 as an exemplary embodiment of the system 102 for assigning dynamic operation of devices in a communication network, in accordance with an embodiment of the present subject matter.

Referring now to FIG. 5, an AR/VR device framework 500 is disclosed as an exemplary embodiment of the system 102 for assigning dynamic operation of devices in a communication network, in accordance with an embodiment of the present subject matter.

The AR/VR device framework 500 shows an operation of one or more AR (Augmented Reality)/VR (Virtual Reality) devices in a communication network. In one exemplary embodiment, the one or more AR/VR devices may be operated in various contexts with one or more contextual attributes. The one or more contextual attributes may indicate an intent of operation of the one or more AR/VR devices. The one or more contextual attributes associated with the AR/VR devices may be corporate trainings, gaming and entertainment, simulations and the like. In one aspect, the one or more AR/VR devices may be used in the corporate trainings for monitoring and training one or more employees or personnel. In another aspect, the one or more video edge devices may be used in the gaming and entertainment for interactive gaming. In yet another aspect, the one or more AR/VR devices may be used in the simulations for one or more of medical, high-tech (aircraft, flight, space) simulations and the like.

In one embodiment, the AR/R device framework 500 shows that the one or more AR/VR devices may be programmed to operate dynamically based on the one or more contextual attributes. More particularly, the same cluster of the one or more AR/VR devices may need to behave differently at different times for the one or more contextual attributes. In one exemplary embodiment, a set of corporate training devices may have to work as simulation devices during certain period of time. Further, the set of corporate training devices may be used for gaming at certain other period of time. The system 102 may assign dynamic operations such as one or more of a content filtering, a skill acquisition and the like to the one or more AR/VR devices based on the more contextual attributes.

Further, the AR/VR device framework 500 shows a determination and an assignment of one or more network slices such as a high bandwidth slice, a low latency slice, and a massive device slice based on the one or more contextual attributes. In addition, the AR/R device framework 500 shows a determination and an assignment of one or more analytical models, such as a neural network model, a deep learning model, a reinforced learning model, and the like, based on the one or more contextual attributes.

Figure 6:
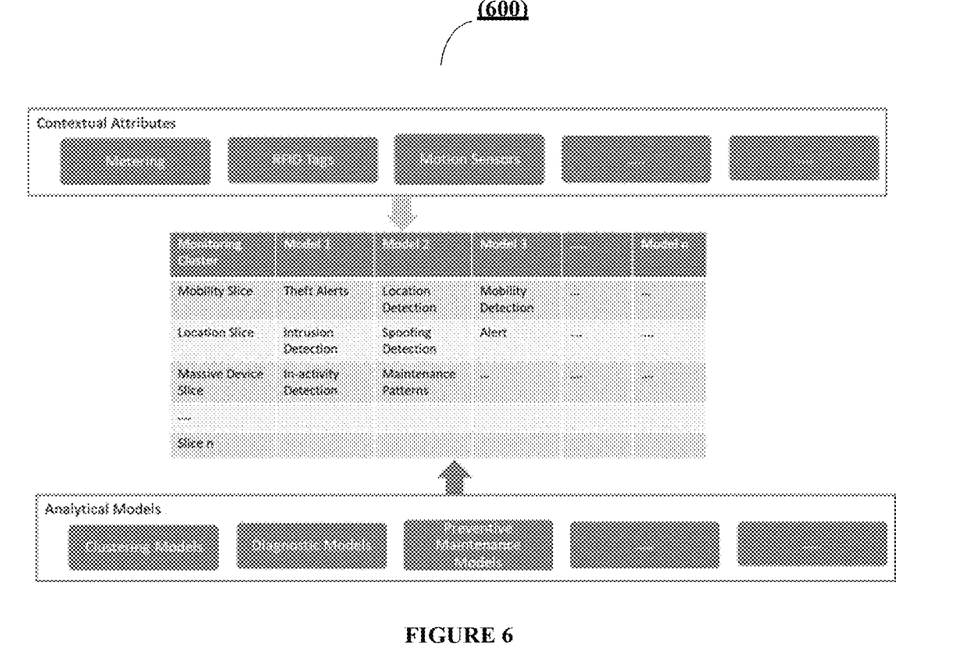
FIG. 6 illustrates an IOT device framework 600 as an exemplary embodiment of the system 102 for assigning dynamic operation of devices in a communication network, in accordance with an embodiment of the present subject matter.

Referring now to FIG. 6, an IOT device framework 600 is disclosed as an exemplary embodiment of the system 102 for assigning dynamic operation of devices in a communication network, in accordance with an embodiment of the present subject matter.

The IOT device framework 600 shows an operation of one or more IOT devices in a communication network. In one exemplary embodiment, the one or more IOT devices may be operated in various contexts with one or more contextual attributes. The one or more contextual attributes may indicate an intent of operation of the one or more IOT devices. The one or more contextual attributes associated with the one or more IOT devices may be metering, RFID tags, motion sensors and the like. In one aspect, the one or more IOT devices may be used in the metering for measure services like electricity, water, gas etc. In another aspect, the one or more IOT devices may be used in the RFID tags for monitoring goods and inventory tracking in enterprises, factories and shops. In yet another aspect, the one or more IOT devices may be used in the motion sensors for medical, high-tech (Aircraft, flight, space) equipment and the like.

In one embodiment, the IOT device framework 600 shows that the one or more IOT devices may be programmed to operate dynamically based on the one or more contextual attributes. In one example, a monitoring cluster associated with the one or more IOT devices may need to behave differently at different times for the one or more contextual attributes. The system 102 may assign dynamic operation such as theft alerts, location detection and the like to the one or more IOT devices based on the more contextual attributes.

Further, The IOT device framework 600 shows a determination and an assignment of one or more network slices such as a mobility slice, a location slice, a massive device slice, and the like, based on the one or more contextual attributes. In addition, the IOT device framework 600 shows a determination and an assignment of one or more analytical models such as a clustering model, a diagnostic model, a preventive maintenance model, and the like, based on the one or more contextual attributes.

Figure 7:
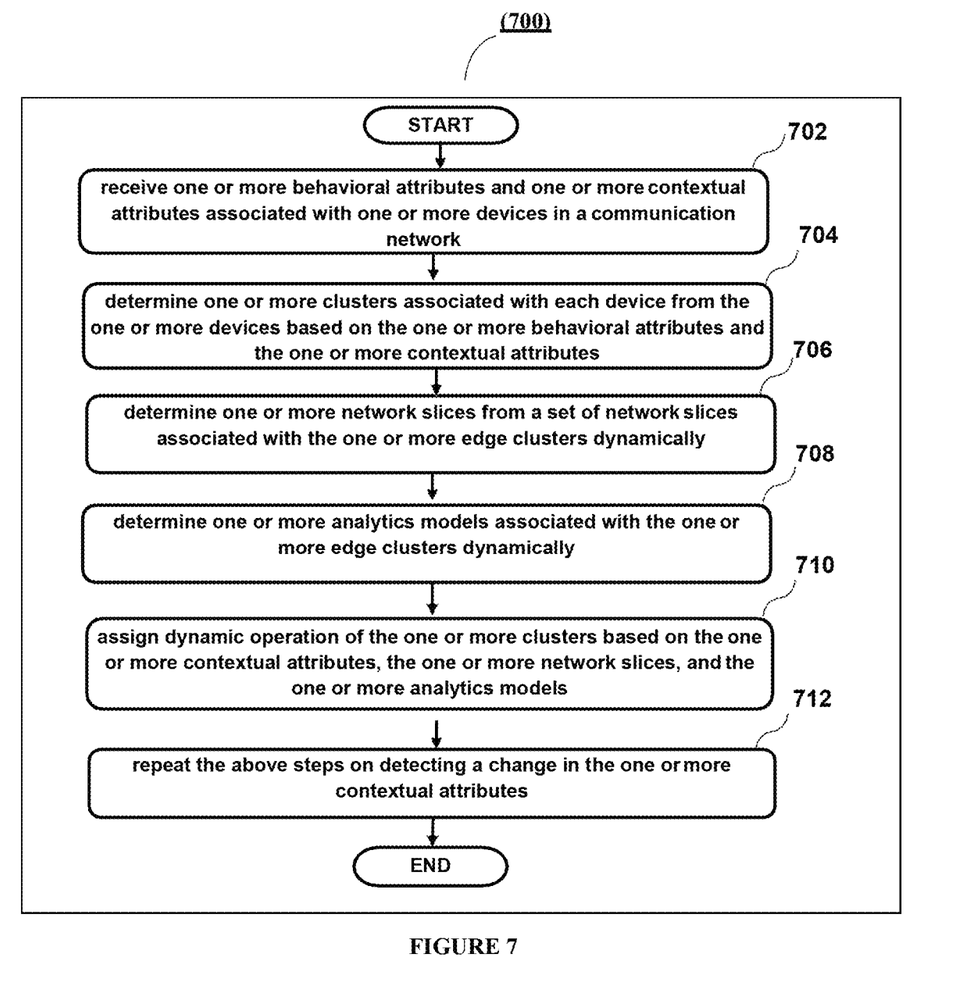
FIG. 7 illustrates a method 700 for assigning dynamic operation of devices in a communication network, in accordance with an embodiment of the present subject matter.

Referring now to FIG. 7, a method 700 for assigning dynamic operation of devices in a communication network, is disclosed in accordance with an embodiment of the present subject matter. The method 700 may be described in the general context of computer executable instructions. Generally, computer executable instructions can include routines, programs, objects, components, data structures, procedures, modules, functions, and the like, that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method 700 can be implemented in any suitable hardware, software, firmware, or combination thereof. However, for ease of explanation, in the embodiments described below, the method 700 may be considered to be implemented in the above described system 102.

At block 702, one or more behavioral attributes and one or more contextual attributes associated with one or more devices 232 in a communication network may be received. The one or more contextual attributes may indicate an intent of operation of the one or more devices 232.

Further, the one or more behavioural attributes and the one or more contextual attributes may comprise the intent of the operation for performing one or more of a prediction, an image recognition, a forecasting, an anomaly detection, a filtering, a flow management, a trend analysis and other artificial intelligence operations with speed, latency, and efficiency of the one or more devices 232.

At block 704, one or more clusters 234 associated with each device from the one or more devices 232 may be determined. The one or more clusters 234 may be determined based on the one or more behavioral attributes and the one or more contextual attributes.

In one embodiment, the one or more clusters 234 may be one of a Conventional Edge Cluster (CEC) 234A, a New Radio Edge Cluster (NREC) 234B, and a Low Power Devices based Edge Cluster (LPDEC) 234C.

In one aspect, the Conventional Edge Cluster (CEC) 234A may comprise one or more devices supporting one of a Wireless Fidelity (Wi-Fi), Long term Evolution (LTE), Global System for Mobile (GSM), Code Division Multiple Access (CDMA) based communication and the other legacy wireless communication techniques.

In one aspect, the New Radio Edge Cluster (NREC) 234B may comprise one or more devices supporting New Radio (NR) type 5G communication configured with the one or more network slices.

In one aspect, the Low Power Devices based Edge Cluster (LPDEC) 234C may comprise one or more devices supporting one of a NB-LTE, LoRAWAN, Near Field Communication (NFC), IPv6 Low Power Wireless Personal Area Networks (6LoWPAN), Z-Wave, SigFox based communication and other low power short range radio access technologies.

In one embodiment, the NREC 234B, may be multitude in number and may increase by adding or converting adjacent one or more clusters 234 to support one or more of sensors, IoT devices, V2V (Vehicle-to-Vehicle), V2X (Vehicle-to-everything), AR/VR/MR type devices. The one or more devices associated with the NREC 234B may support the functionalities of the CEC cluster 234A and the LPDEC cluster 234C as per requirement.

At block 706, one or more network slices, from a set of network slices, associated with the one or more clusters 234 may be determined. The one or more network slices may be determined based on a mapping of the one or more network slices with the one or more contextual attributes. The mapping of the one or more network slices with the one or more contextual attributes may be generated based on a neural based model 240 with deep learning techniques. The neural based model 240 may utilize historical data to generate the mapping.

Further, the one or more network slices may comprise one or more network slice parameters. The one or more network slice parameters may comprise one or more of a device type, a bandwidth, a latency, a coverage, a mobility, a cluster type, an access protocol, an edge support, a service type, a throughput requirement, a periodic communication type, an isolation level, a slice type, a frequent changing behavior of device cluster or context, and most used network slicing type.

At block 708, one or more analytics models associated with the one or more clusters 234 may be determined. The one or more analytics models may be determined based on the one or more contextual attributes and the one or more behavioral attributes. The one or more analytics models may perform a processing on data generated by the one or more devices 232.

The one or more analytics models may comprise one or more of a machine learning model, a neural network model, a deep learning model, a reinforced learning model, a regression model, and a classification model.

At block 710, a dynamic operation of the one or more clusters 234 may be assigned based on the one or more contextual attributes, the one or more network slices and the one or more analytics models.

At block 712, the above steps 702 to 710 may be repeated on detecting a change in the one more contextual attributes.

Exemplary embodiments discussed above may provide certain advantages. Though not required to practice aspects of the disclosure, these advantages may include those provided by the following features.

Some embodiments of the system and the method may be configured to improve the edge computing in real time using context-aware based intelligent edge device operation.

Some embodiments of the system and the method may be configured to provide dynamic allocation of network resources based on intelligent network slicing mechanism.

Some embodiments of the system and the method may be configured to improve a network connection with intelligently connected edge devices.

Some embodiments of the system and the method may assign edge computing capability to end-services based on dynamic contextual attributes and behavioral attributes associated with the edge devices.

Some embodiments of the system and method may enable dynamic configuration of the edge devices as per requirement, for providing improved data prediction and connection establishment of the edge devices.

Some embodiments of the system and method may reduce the cloud-based process and increase the use of edge based accurate data services and prediction models.

Some embodiments of the system and the method may enable building a secure intelligent clustering with different edge functionalities, network slicing methods, SDN and VNF based security layers for the specific clusters based on context aware intelligent mechanisms.

Although implementations for systems and methods for assigning dynamic operation of devices in a communication network, it is to be understood that the appended claims are not necessarily limited to the specific features or methods described. Rather, the specific features and methods are disclosed as examples of implementations for assigning dynamic operation of devices in a communication network.

The invention claimed is:

1. A system (102) for assigning dynamic operation of devices in a communication network (106), wherein the system (102) comprising:
   a memory;
   a processor coupled to the memory, wherein the processor is configured to execute instructions stored in the memory to:
   receive one or more behavioral attributes and one or more contextual attributes associated with one or more devices (232) in a communication network (106), wherein the one or more contextual attributes indicate an intent of operation of the one or more devices (232);
   determine one or more clusters (234) associated with each device from the one or more devices (232) based on the one or more behavioral attributes and the one or more contextual attributes;
   determine, dynamically, one or more network slices, from a set of network slices associated with the one or more clusters (234), wherein the one or more network slices are determined based on a mapping of the one or more network slices with the one or more contextual attributes;
   determine, dynamically, one or more analytics models associated with the one or more clusters (234), wherein the one or more analytics models are determined based on the one or more contextual attributes and the one or more behavioral attributes; and
   assign dynamic operation of the one or more clusters (234) based on the one or more contextual attributes, the one or more network slices and the one or more analytics models, thereby assigning the dynamic operation of the devices in the communication network (106).

2. The system (102) as claimed in claim 1, wherein the one or more behavioural attributes and the one or more contextual attributes comprises the intent of the operation for performing one or more of a prediction, an image recognition, a forecasting, an anomaly detection, a filtering, a flow management, a trend analysis and other artificial intelligence operations with speed, latency, and efficiency of the one or more devices (232).

3. The system (102) as claimed in claim 1, wherein the one or more network slices comprises one or more network slice parameters, and wherein the one or more network slice parameters comprises one or more of a device type, a bandwidth, a latency, a throughput, a protocol, and a cluster type.

4. The system (102) as claimed in claim 1, wherein the one or more analytics models perform a processing on data generated by the one or more devices (232), and wherein the one or more analytics models comprises one or more of a machine learning model, a neural network model, a deep learning model, a reinforced learning model, a regression model, and a classification model.

5. The system (102) as claimed in claim 1, wherein the mapping of the one or more network slices with the one or more contextual attributes is generated based on a neural based model (240) with deep learning techniques, and wherein the neural based model (240) utilizes historical data to generate the mapping.

6. The system (102) as claimed in claim 1, wherein the one or more contextual attributes and the one or more behavioral attributes are analysed based on historical data to determine the one or more analytics models.

7. The system (102) as claimed in claim 1, wherein the one or more clusters 234 may be one of a Conventional Edge Cluster (CEC) 234A, a New Radio Edge Cluster (NREC) 234B, and a Low Power Devices based Edge Cluster (LPDEC) 234C.

8. The system (102) as claimed in claim 7, wherein the CEC cluster (234A) comprises one or more devices supporting one of a Wi-Fi, LTE, GSM and CDMA communication and legacy wireless communications, and wherein the NREC cluster (234B) comprises one or more devices supporting new radio type 5G communication, and wherein the LPDEC cluster (234C) comprises one or more devices supporting one of a NB-LTE, LoRAWAN, Near Field Communication (NFC), 6LoWPAN communication and low power short range radio access technologies.

9. A method (700) for assigning dynamic operation of devices in a communication network (106), wherein the method comprises:
   receiving, by a processor, one or more behavioral attributes and one or more contextual attributes associated with one or more devices (232) in a communication network (106), wherein the one or more contextual attributes indicate an intent of operation of the one or more devices (232);
   determining, by the processor, one or more clusters (234) associated with each device from the one or more devices (232) based on the one or more behavioral attributes and the one or more contextual attributes;
   determining dynamically, by the processor, one or more network slices from a set of network slices associated with the one or more clusters (234), wherein the one or more network slices are determined based on a mapping of the one or more network slices with the one or more contextual attributes;
   determining dynamically, by the processor, one or more analytics models associated with the one or more clusters (234), wherein the one or more analytics models are determined based on the one or more contextual attributes and the one or more behavioral attributes; and
   assigning, by the processor, dynamic operation of the one or more clusters (234) based on the one or more contextual attributes, one or more network slices and one or more analytics models, thereby assigning the dynamic operation of the devices (232) in the communication network (106).

10. The method (700) as claimed in claim 9, wherein the one or more behavioural attributes and the one or more contextual attributes comprises the intent of the operation for performing one or more of a prediction, an image recognition, a forecasting, an anomaly detection, a filtering, a flow management, a trend analysis and other artificial intelligence operations with speed, latency, and efficiency of the one or more devices (232).

11. The method (700) as claimed in claim 9, wherein the one or more network slices comprises one or more network slice parameters, and wherein the one or more network slice parameters comprises one or more of a device type, a bandwidth, a latency, a throughput, a protocol, and a cluster type.

12. The method (700) as claimed in claim 9, wherein the one or more analytics models perform a processing on data generated by the one or more devices (232), and wherein the one or more analytics models comprises one or more of a machine learning model, a neural network model, a deep learning model, a reinforced learning model, a regression model, and a classification model.

13. The method (700) as claimed in claim 9, wherein the mapping of the one or more network slices with the one or more contextual attributes is generated based on a neural based model (240) with deep learning techniques, and wherein the neural based model (240) utilizes historical data to generate the mapping.

14. The method (700) as claimed in claim 9, wherein the one or more contextual attributes and the one or more behavioral attributes are analysed based on historical data to determine the one or more analytics models.

15. The method (700) as claimed in claim 9, wherein the one or more clusters (234) may be one of a Conventional Edge Cluster (CEC) (234A), a New Radio Edge Cluster (NREC) (234B), and a Low Power Devices based Edge Cluster (LPDEC) (234C).

16. The method (700) as claimed in claim 15, wherein the CEC cluster (234A) comprises one or more devices supporting one of a Wi-Fi, LTE, GSM, CDMA and legacy wireless communications, and wherein the NREC cluster (234B) comprises one or more devices supporting new radio type 5G communication and wherein the LPDEC cluster (234C) comprises one or more devices supporting one of a NB-LTE, LoRAWAN, Near Field Communication (NFC), 6LoWPAN communication and low power short range radio access technologies.

* * * * *